(12) United States Patent
Wang et al.

(10) Patent No.: US 11,570,348 B2
(45) Date of Patent: Jan. 31, 2023

(54) ELECTROMAGNETIC INTERFERENCE CONTROL METHOD AND RELATED PRODUCT

(71) Applicant: GUANGDONG OPPO MOBILE TELECOMMUNICATIONS CORP., LTD., Guangdong (CN)

(72) Inventors: Xunfeng Wang, Guangdong (CN); Zhengpeng Tan, Guangdong (CN); Kai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 53 days.

(21) Appl. No.: 17/339,528

(22) Filed: Jun. 4, 2021

(65) Prior Publication Data

US 2021/0297571 A1    Sep. 23, 2021

Related U.S. Application Data

(63) Continuation of application No. PCT/CN2019/109998, filed on Oct. 8, 2019.

(30) Foreign Application Priority Data

Dec. 11, 2018    (CN) .......................... 201811509981.7

(51) Int. Cl.
*H04N 5/232*    (2006.01)
(52) U.S. Cl.
CPC .................................... *H04N 5/232* (2013.01)
(58) Field of Classification Search
CPC ...................................................... H04N 5/232
See application file for complete search history.

(56) References Cited

U.S. PATENT DOCUMENTS

2005/0255881 A1    11/2005    Yamamoto et al.
2009/0074153 A1    3/2009    Wu et al.
(Continued)

FOREIGN PATENT DOCUMENTS

CN    101060593 A    10/2007
CN    205385531 U    7/2016
(Continued)

OTHER PUBLICATIONS

Extended European Search Report for EP Application 19894776.4 dated Jan. 14, 2022. (8 pages).
(Continued)

*Primary Examiner* — Twyler L Haskins
*Assistant Examiner* — Fayez A Bhuiyan
(74) *Attorney, Agent, or Firm* — Young Basile Hanlon & MacFarlane, P.C.

(57) ABSTRACT

Disclosed are an electromagnetic interference control method and a related product. The method is for an electronic device including an antenna and a camera. The method includes: obtaining a first operating frequency of the camera and a second operating frequency of the antenna; determining the second operating frequency is interfered; in response to the second operating frequency being interfered, obtaining a target frame rate range; determining an operating frequency of the camera corresponding to each frame rate in the target frame rate range; obtaining an operating frequency list; determining at least one third operating frequency from the operating frequency list; and selecting one third operating frequency from the at least one third operating frequency as a first target operating frequency; determining a first target frame rate; operating the camera at the first target operating frequency; and performing the video function based on the first target frame rate.

20 Claims, 5 Drawing Sheets

(56) References Cited

U.S. PATENT DOCUMENTS

| | | | |
|---|---|---|---|
| 2015/0181333 A1 | 6/2015 | Lee et al. | |
| 2016/0124071 A1 | 5/2016 | Baxley et al. | |
| 2018/0138991 A1 | 5/2018 | Wang et al. | |
| 2021/0382941 A1* | 12/2021 | Wu | G06F 16/732 |
| 2022/0092883 A1* | 3/2022 | He | H01Q 3/34 |

FOREIGN PATENT DOCUMENTS

| | | |
|---|---|---|
| CN | 105871478 A | 8/2016 |
| CN | 106936515 A | 7/2017 |
| CN | 107147453 A | 9/2017 |
| CN | 107231201 A | 10/2017 |
| CN | 108521658 A | 9/2018 |
| CN | 108601037 A | 9/2018 |
| CN | 109743129 A | 5/2019 |
| EP | 2299754 A | 3/2011 |
| EP | 3276926 A1 | 1/2018 |
| JP | 2004179861 A | 6/2004 |
| JP | 2005328425 A | 11/2005 |
| JP | 2009500930 A | 1/2009 |
| JP | 2010183300 A | 8/2010 |
| KR | 20060029476 A | 4/2006 |
| WO | 2006090744 A1 | 8/2006 |
| WO | 2007081625 A3 | 7/2007 |

OTHER PUBLICATIONS

Indian Examination Report for IN Application 202117030103 dated Mar. 8, 2022. (6 pages).

International Search Report with English Translation of PCT/CN2019/109998 dated Dec. 30, 2019 (13 pages).

China First Office Action with English Translation in CN Application 201811509981.7 dated Feb. 3, 2020 (9 pages).

China Notice with English Translation of allowance in a CN Application 201811509981.7 dated May 8, 2020 (6 pages).

Japanese Notice of Reasons for Refusal with English Translation for Japanese Patent Application No. 2021-533290, dated Aug. 2, 2022 (7 pages).

Korean Request for the Submission of an Opinion with English Translation for KR Application No. 10-2021-7021678, dated Aug. 1, 2022 (13 pages).

* cited by examiner

ELECTROMAGNETIC INTERFERENCE CONTROL METHOD AND RELATED PRODUCT

CROSS-REFERENCE TO RELATED APPLICATION(S)

The present application is a continuation-application of International (PCT) Patent Application No. PCT/CN2019/109998, filed on Oct. 8, 2019, which claims priority of Chinese Patent Application No. CN 201811509981.7, filed on Dec. 11, 2018, the entire contents of both of which are hereby incorporated by reference.

TECHNICAL FIELD

The present disclosure relates to the field of electronic technologies, and in particular to an electromagnetic interference control method and a related product.

BACKGROUND

With the development of mobile communication technologies, users have an increasing demand for communication with electronic devices such as a mobile phone. An electronic device on the market generally transmits data through cellular mobile network communication, Wi-Fi communication or the like. Full-screen mobile phones are facing radio frequency interference problems. For example, when the electronic device is video shooting or video chatting, a camera frame rate is required to be high and may cause interference to radio frequency signals of an antenna.

At present, hardware upgrades may improve interferences to each module but will increase the cost with limited improvement effect. Therefore, the problem of reducing the camera frame rate which causes the interference to radio frequency signals of the antenna is required to be solved urgently.

SUMMARY

The present disclosure provides an electromagnetic interference control method and a related product, such that interference of the frame rate of a camera to the radio frequency signal of an antenna when video shooting or video chatting.

In a first aspect, embodiments of the present disclosure provides an electromagnetic interference control method for an electronic device; wherein the electronic device includes an antenna and a camera; the electromagnetic interference control method includes: obtaining a first operating frequency of the camera and a second operating frequency of the antenna in response to a video function of the camera being activated; determining the second operating frequency is interfered based on the first operating frequency; in response to the second operating frequency being interfered, obtaining a target frame rate range; determining an operating frequency of the camera corresponding to each frame rate in the target frame rate range based on a preset mapping relationship between an operating frequency of the camera and a frame rate of the camera; and obtaining an operating frequency list comprising the operating frequency of the camera corresponding to all frame rates in the target frame rate range; determining at least one third operating frequency from the operating frequency list, wherein an interference caused by each of the at least one third operating frequency to the second operating frequency is less than an interference caused by the first operating frequency to the second operating frequency; and selecting one third operating frequency from the at least one third operating frequency as a first target operating frequency; determining a first target frame rate based on the first target operating frequency; operating the camera at the first target operating frequency; and performing the video function based on the first target frame rate.

In a second aspect, embodiments of the present disclosure provides an electronic device, including: an antenna, a camera, a processor, a memory, a communication interface, and one or more programs; wherein the one or more programs are stored in the memory and are configured to be performed by the processor; the one or more programs includes instructions configured to perform the operations in the first aspect of the embodiments of the present disclosure.

In a third aspect, embodiments of the present disclosure provides a non-transitory computer-readable storage medium, storing a computer program for exchange of electronic data; wherein the computer program causes a computer to perform part of or all the operations in the first aspect of the embodiments of the present disclosure.

BRIEF DESCRIPTION OF DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For a person skilled in the art, other drawings can be obtained based on these drawings without creative work.

DETAILED DESCRIPTION

In order to enable a person skilled in the art to better understand the solutions of the present disclosure, the technical solutions in the embodiments of the present disclosure will be described clearly and completely in conjunction with the accompanying drawings in the embodiments of the present disclosure. Obviously, the described embodiments some of the present disclosure, but not all the embodiments. Based on the embodiments in the present disclosure, all other embodiments obtained by a person skilled in the art without creative work shall fall within the scope of the present disclosure.

The terms "first", "second", etc. in the specification and claims of the present disclosure and the above-mentioned drawings are to distinguish different objects, rather than to describe a specific sequence. In addition, the terms "including" and "having" and any variations thereof are intended to cover non-exclusive inclusion. For example, a process, method, system, product, or device that includes a series of steps or units is not limited to the listed steps or units, but optionally includes unlisted steps or units, or optionally also includes other steps or units inherent to the process, method, product or device.

Reference to "embodiments" herein means that a specific feature, structure, or characteristic described in conjunction with the embodiments may be included in at least one embodiment of the present disclosure. The appearance of the phrase in various places in the specification does not necessarily refer to a same embodiment, nor is it an independent or alternative embodiment mutually exclusive with other embodiments. A person skilled in the art clearly and implicitly understand that the embodiments described herein can be combined with other embodiments.

The electronic device involved in the embodiments of the present disclosure may include various handheld devices, vehicle-mounted devices, wireless headsets, computing devices with wireless communication functions or other processing devices connected to wireless modems, as well as various forms of user equipment (UE), mobile station (MS), terminal device, etc. The electronic device may be, for example, a smart phone, a tablet computer, a headset box, and so on. For ease of description, the devices mentioned above are collectively referred to as the electronic device.

Figure 1A:
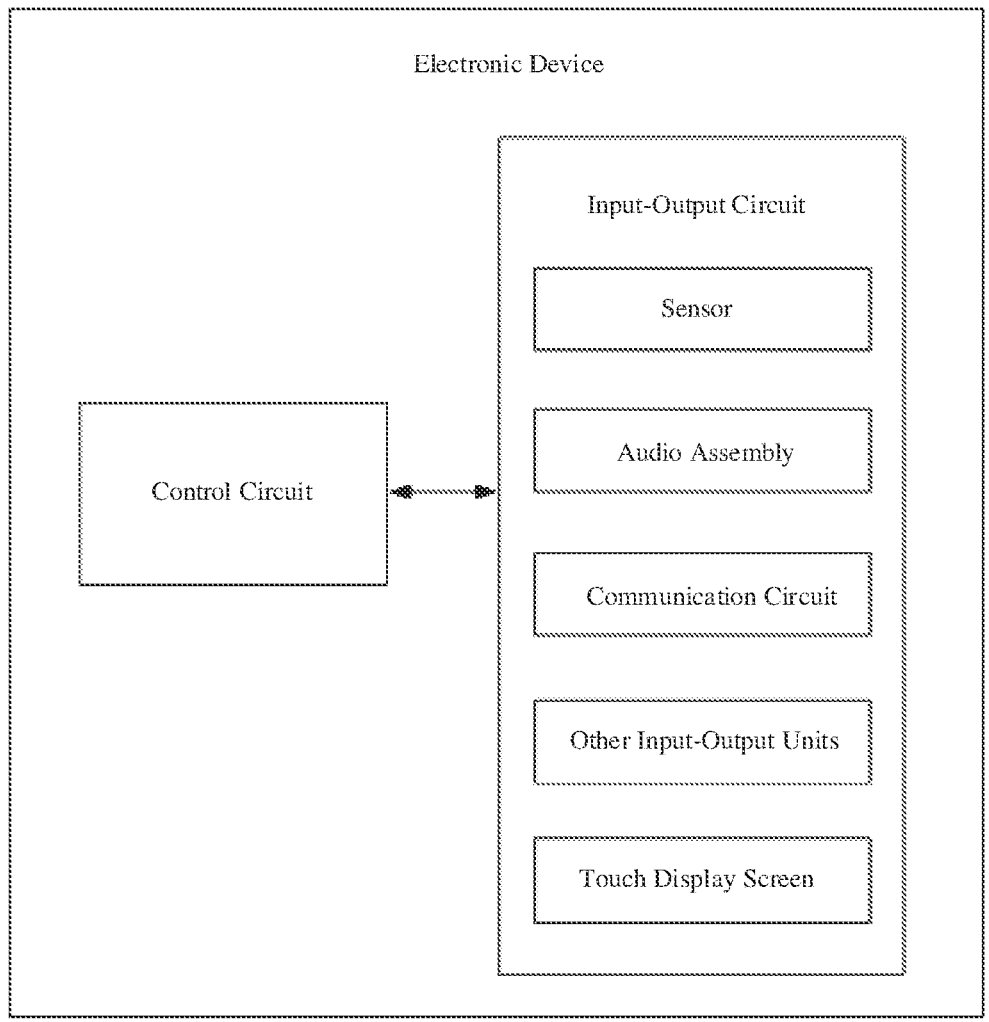
FIG. 1A is a structural schematic view of an electronic device according to an embodiment of the present disclosure.

Referring to FIG. 1A, FIG. 1A is a structural schematic view of an electronic device according to an embodiment of the present disclosure. The electronic device includes a control circuit and an input-output circuit connected to the control circuit.

The control circuit may include storage-processing circuits. The storage circuit in the storage-processing circuit may be a memory, such as a hard disk drive memory, a non-volatile memory (such as flash memory or other electronic programmable read-only memory configured to form a solid-state drive, etc.), and a volatile memory (such as static or dynamic random access memory, etc.), etc., which are not limited in the embodiment of the present disclosure. The processing circuit in the storage-processing circuit may be configured to control the operation of electronic device. The processing circuit may be implemented based on one or more microprocessors, microcontrollers, digital signal processors, baseband processors, power management units, audio codec chips, application-specific integrated circuits, display driver integrated circuits, etc.

The storage-processing circuit may be configured to run software in the electronic device. The software may be an application playing incoming call notification ringing, an application playing short message prompting ringing, an application playing alarm clock prompting ringing, an application playing media file, and an application making voice over internet protocol (VOIP) phone call, operating system functions, etc. The software may be configured to perform some control operations, such as playing incoming call prompt ringing, playing short message prompting ringing, playing alarm clock prompting ringing, playing media files, making voice phone calls, and other functions in electronic devices, etc., which is not limited herein.

The input-output circuit may be configured to enable the electronic device to input and output data, that is, allow the electronic device to receive data from an external device and allow the electronic device to output data from the electronic device to the external device.

The input-output circuit may further include a sensor. The sensor may include an environmental light sensor, an infrared proximity sensor based on light and capacitance, an ultrasonic sensor, a touch sensor (for example, a light-based touch sensor and/or a capacitive touch sensor; the touch sensor may be a part of a touch screen, and may also be configured independently as a touch sensor structure), an acceleration sensor, gravity sensor, and other sensors. The input-output circuit may further include an audio assembly which may be configured to provide audio input and output functions for the electronic device. The audio assembly may also include a tone generator and other assemblies for generating and detecting sounds.

The input-output circuit may also include one or more display screens. The display screen may include one or a combination of a liquid crystal display screen, an organic light emitting diode display screen, an electronic ink display screen, a plasma display screen, and a display screen with other display technologies. The display screen may include a touch sensor array (that is, the display screen may be a touch display screen). The touch sensor may be a capacitive touch sensor formed by an array of transparent touch sensor electrodes (such as indium tin oxide (ITO) electrodes), or may be a touch sensor formed by other touch technologies, such as sonic touch, pressure-sensitive touch, resistance touch, optical touch, etc., which is not limited herein.

The input-output circuit may further include a communication circuit that may be configured to provide the electronic device with an ability to communicate with external devices. The communication circuit may include an analog and digital input-output interface circuit, and a wireless communication circuit based on radio frequency signals and/or optical signals. The wireless communication circuit in the communication circuit may include a radio frequency transceiver circuit, a power amplifier circuit, a low noise amplifier, a switch, a filter, and an antenna. For example, the wireless communication circuit in the communication circuit may include a circuit for supporting near field communication (NFC) by transmitting and receiving near-field coupled electromagnetic signals. For example, the communication circuit may include a near field communication antenna and a near field communication transceiver. The communication circuit may also include a cellular phone transceiver and antenna, a wireless local area network transceiver circuit and antenna, etc.

The input-output circuit may further include other input-output units. The input-output unit may include a button, a joystick, a click wheel, a scroll wheel, a touch pad, a keypad, a keyboard, a camera, light emitting diodes, and other status indicators.

The electronic device may further include a battery (not shown) configured to provide electrical energy to the electronic device.

The embodiments of the present disclosure are described in detail below.

Figure 1B:
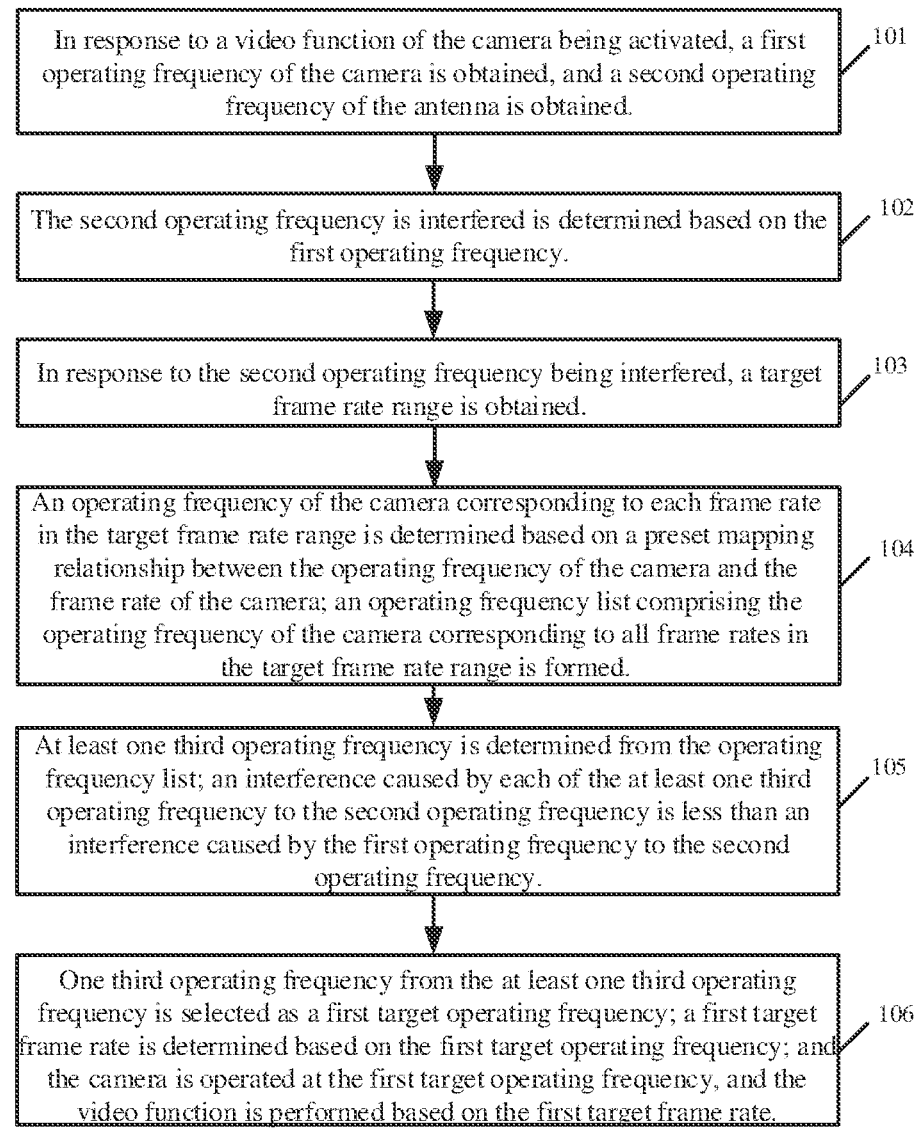
FIG. 1B is a flowchart of an electromagnetic interference control method according to an embodiment of the present disclosure.

Referring to FIG. 1B, FIG. 1B is a flowchart of an electromagnetic interference control method according to an embodiment of the present disclosure. The electromagnetic interference control method may be applied to the electronic device described in FIG. 1A. The electronic device includes an antenna and a camera. The electromagnetic interference control method may include following operations at blocks 101-106.

At block 101: In response to a video function of the camera being activated, a first operating frequency of the camera is obtained, and a second operating frequency of the antenna is obtained.

In the embodiments of the present disclosure, the above-mentioned video function may include any one of the following: video chat function (such as WeChat video, QQ video, etc.), video shooting function, etc., which is not limited herein. Since the antenna of the electronic device is close to the camera, after the video function of the camera is activated, the working frequencies of the antenna and the camera will interfere with each other when working at the same time. Therefore, the first operating frequency of the camera and the second operating frequency of the antenna are obtained. In a specific implementation, the electronic device may obtain the first operating frequency of the camera and the second operating frequency of the antenna according to a preset duration. The preset duration may be set based on configuration from the user or defaulted by the system.

At block 102: The second operating frequency is interfered is determined based on the first operating frequency.

In the embodiments of the present disclosure, after the electronic device obtains the first operating frequency of the camera and the second operating frequency of the antenna, the electronic device may determine whether the second operating frequency of the antenna is interfered according to or based on the first operating frequency and the second operating frequency. Specifically, when the first operating frequency is the same as the second operating frequency, or when one of the working frequencies is an integer multiple of the other, the two working frequencies are determine to interfere with each other.

In some embodiments, in the operation 102, the determining whether the second operating frequency is interfered based on the first operating frequency may include operations as followed.

21: A target interference frequency list corresponding to the second operating frequency is determined based on a preset correspondence between an operating frequency of the antenna and an interference frequency list of the camera; the target interference frequency list includes at least one operating frequency.

22: When the first operating frequency is in the target interference frequency list, the second operating frequency is determined to be interfered by the first operating frequency.

The preset correspondence between the operating frequency of the antenna and the interference frequency list of the camera may be stored in the electronic device in advance and set based on configuration from the user or defaulted by the system. The electronic device may obtain in advance multiple interference frequency lists for the operating frequency of the antenna under multiple operating frequencies of the camera. For example, interference frequency list 1 to interference frequency list n may be obtained, where n is an integer greater than 1. Each operating frequency of the antenna corresponds to an interference frequency list of the operating frequency of the camera. Each interference frequency list may include multiple interference frequencies of the camera. Thus, the correspondence between the operating frequency of the antenna and the interference frequency list of the camera is formed. In this way, after the second operating frequency of the antenna is obtained, the target interference frequency list of the camera corresponding to the second operating frequency of the antenna may be determined. When the first operating frequency is in the target interference frequency list, the second operating frequency is determined to be interfered by the first operating frequency. When the first operating frequency is not in the target interference frequency list, the second operating frequency is determined not to be interfered by the first operating frequency.

At block 103: In response to the second operating frequency being interfered, a target frame rate range is obtained.

In the embodiments of the present disclosure, the target frame rate range may be set based on configuration from the user or defaulted by the system, or the target frame rate range may be pre-stored in the memory of the electronic device. The target frame rate range may include one or more frame rates. When the second operating frequency is interfered, the electronic device may obtain the target frame rate range.

In some embodiments, the foregoing operation 103, obtaining the target frame rate range, may include the following operations.

31: A target environmental brightness is obtained.

32: A target frame rate range corresponding to the target environmental brightness is determined based on a preset mapping relationship between an environmental brightness and a frame rate range of the camera.

In the embodiments of the present disclosure, the electronic device may be arranged with an environmental light sensor. The electronic device may obtain the target environmental brightness through the environmental light sensor. In a specific implementation, the brightness change of the working environment of the camera may interfere with the frame rate of the camera. When light is dark and the environment brightness is low, the frame rate of the camera will decrease, affecting the video function of the camera. When the second operating frequency is interfered, the brightness of the current environment of the electronic device may be obtained.

In addition, in the embodiments of the present disclosure, the environmental brightness may interfere with the frame rate of the camera. The frame rate of the camera is related to the operating frequency of the camera. The operating frequency of the camera may interfere with the operating frequency of the antenna. The target environmental brightness may be the brightness of the current environment. The electronic device may pre-store the preset mapping relationship between the environmental brightness and the frame rate range of the camera. In this way, the target frame rate range corresponding to the target environmental brightness may be determined based on the mapping relationship. The target frame rate range includes at least one frame rate.

In some embodiments, the foregoing operation 31, obtaining the target environmental brightness, may include the following operations.

A1: A multi-frame video image is obtained through the camera.

A2: Multiple average gray values are obtained based on an average gray value of each frame of the multi-frame video image.

A3: A target average gray value corresponding to the multiple average gray values is determined.

A4: The target environmental brightness corresponding to the target average gray value is determined based on a preset mapping relationship between the average gray value and the environmental brightness.

The electronic device may obtain the multi-frame video image through the camera, and determine the average gray value of each frame of the multi-frame video image to obtain the multiple average gray values. The electronic device may calculate the target average gray value of the multiple average gray values, that is, the average value of the multiple average gray values. The electronic device may also pre-store the preset mapping relationship between the gray average value and the environmental brightness, and determine the target environmental brightness corresponding to the target gray average value based on the mapping relationship. In this way, the environmental brightness is determined based on the correlation between the image screen and the environmental brightness.

At block 104: An operating frequency of the camera corresponding to each frame rate in the target frame rate range is determined based on a preset mapping relationship between the operating frequency of the camera and the frame rate of the camera; an operating frequency list comprising the operating frequency of the camera corresponding to all frame rates in the target frame rate range is formed.

The electronic device may pre-store the preset mapping relationship between the operating frequency of the camera and the frame rate of the camera. Further, the operating frequency of the camera corresponding to each frame rate in the target frame rate range may be determined based on the mapping relationship to obtain at least one operating frequency. The operating frequency list of the camera is obtained from the at least one operating frequency.

At block 105: At least one third operating frequency is determined from the operating frequency list; an interference caused by each of the at least one third operating frequency to the second operating frequency is less than an interference caused by the first operating frequency to the second operating frequency.

The electronic device may determine the at least one third operating frequency from the operating frequency list. An interference caused by each of the at least one third operating frequency to the second operating frequency is less than an interference caused by the first operating frequency to the second operating frequency. Specifically, the third operating frequency is not the same as the second operating frequency and does not present a multiplicative relationship with the second operating frequency.

At block 106: One third operating frequency from the at least one third operating frequency is selected as a first target operating frequency; a first target frame rate is determined based on the first target operating frequency; and the camera is operated at the first target operating frequency, and the video function is performed based on the first target frame rate.

The electronic device may select any third operating frequency from the at least one third operating frequency, and determine the target frame rate corresponding to the any third operating frequency based on the preset mapping relationship between the operating frequency of the camera and the frame rate of the camera. The electronic device may realize the video function based on the first target frame rate, and operating the camera at the any third operating frequency.

In some embodiments, after the foregoing operation 106, the following operations may be further included.

B1: When the second operating frequency changes, whether the first target operating frequency interferes with the changed second operating frequency is detected.

B2: In response to the first target operating frequency interfering with the changed second operating frequency, another third operating frequency is selected from the at least one third operating frequency as a second target operating frequency, wherein an interference caused by the second target operating frequency to the changed second operating frequency is less than an interference caused by the first target operating frequency to the changed second operating frequency; a second target frame rate of the camera is determined based on the second target operating frequency; the camera is operated at the second target operating frequency, and the video function is realized based on the second target frame rate.

B3: In response to the first target operating frequency not interfering with the changed second operating frequency, the operation of operating the camera at the first target operating frequency is performed and the video function is realized based on the first target frame rate.

In a specific implementation, when the second operating frequency changes, the electronic device may detect whether the first target operating frequency interferes with the changed second operating frequency, specifically, detect whether the first target operating frequency is the same as the second operating frequency or present a multiplicative relationship. When the first target operating frequency interferes with the changed second operating frequency, another third operating frequency is selected from the at least one third operating frequency as the second target operating frequency, wherein an interference caused by the second target operating frequency to the changed second operating frequency is less than an interference caused by the first target operating frequency to the changed second operating frequency. The second target frame rate of the camera is determined based on the second target operating frequency. The camera is operated at the second target operating frequency, and the video function is realized based on the second target frame rate. When the first target operating frequency does not interfere with the changed second operating frequency, the operation 106 is continued to perform.

In some embodiments, in the embodiments of the present disclosure, when the video function of the camera is activated, before the obtaining the first operating frequency of the camera, the method may further include the following operations.

C1: A signal strength change value of the signal strength of the antenna within a preset duration is obtained, and a start time of the preset duration is the time when the video function is activated.

C2: When the signal strength change value is within a preset range, the operation of obtaining the first operating frequency of the camera is performed.

In the embodiments of the present disclosure, the preset range and the preset duration may be set based on configuration from the user or defaulted by the system. The preset range may refer to a range of the signal strength of the antenna. The preset range may be set based on configuration from the user or defaulted by the system. For example, the preset range of intensity may be set to [−100 dB, −60 dB]. When the antenna of the electronic device receives interference, the signal strength of the antenna will become weak correspondingly. When the electronic device activates the video function, the electronic device may obtain the signal change value of the signal strength of the antenna within the preset duration. The electronic device may detect the signal strength value received by the antenna of the electronic device in real time or periodically. When the detected signal strength change value is within the preset range, the electronic device may determine that the antenna has received interference and performing the obtaining the first operating frequency of the camera. The first operating frequency of the camera may be obtained, where the preset duration and the preset range may be stored in the electronic device in advance, and the preset duration may refer to a period of time from the moment when the electronic device activates the video function.

It can be seen that in the electromagnetic interference control method described in the embodiments of the present disclosure, when the video function of the camera is activated, the first operating frequency of the camera is obtained, and the second operating frequency of the antenna is obtained; whether the second operating frequency is interfered is determined based on the first operating frequency; in response to the second operating frequency being interfered, a target frame rate range is obtained; the operating frequency of the camera corresponding to each frame rate in the target frame rate range is determined based on the preset mapping relationship between the operating frequency of the camera and the frame rate of the camera; an operating frequency list comprising the operating frequency of the camera corresponding to all frame rates is formed; at least one third operating frequency is determined from the operating frequency list; an interference caused by each of the at least one third operating frequency to the second operating frequency is less than an interference caused by the first operating frequency to the second operating frequency; one third operating frequency from the at least one third operating frequency is selected as a first target operating frequency; a target frame rate is determined based on the first target operating frequency; and the camera is operated at the first target operating frequency, and the video function is performed based on the first target frame rate. In this way, when video shooting or video chatting, the interference of the camera frame rate on the radio frequency signal of the antenna may be reduced, the quality of the video call is guaranteed, and no red screen or splash screen will appear on the video screen.

Figure 2:
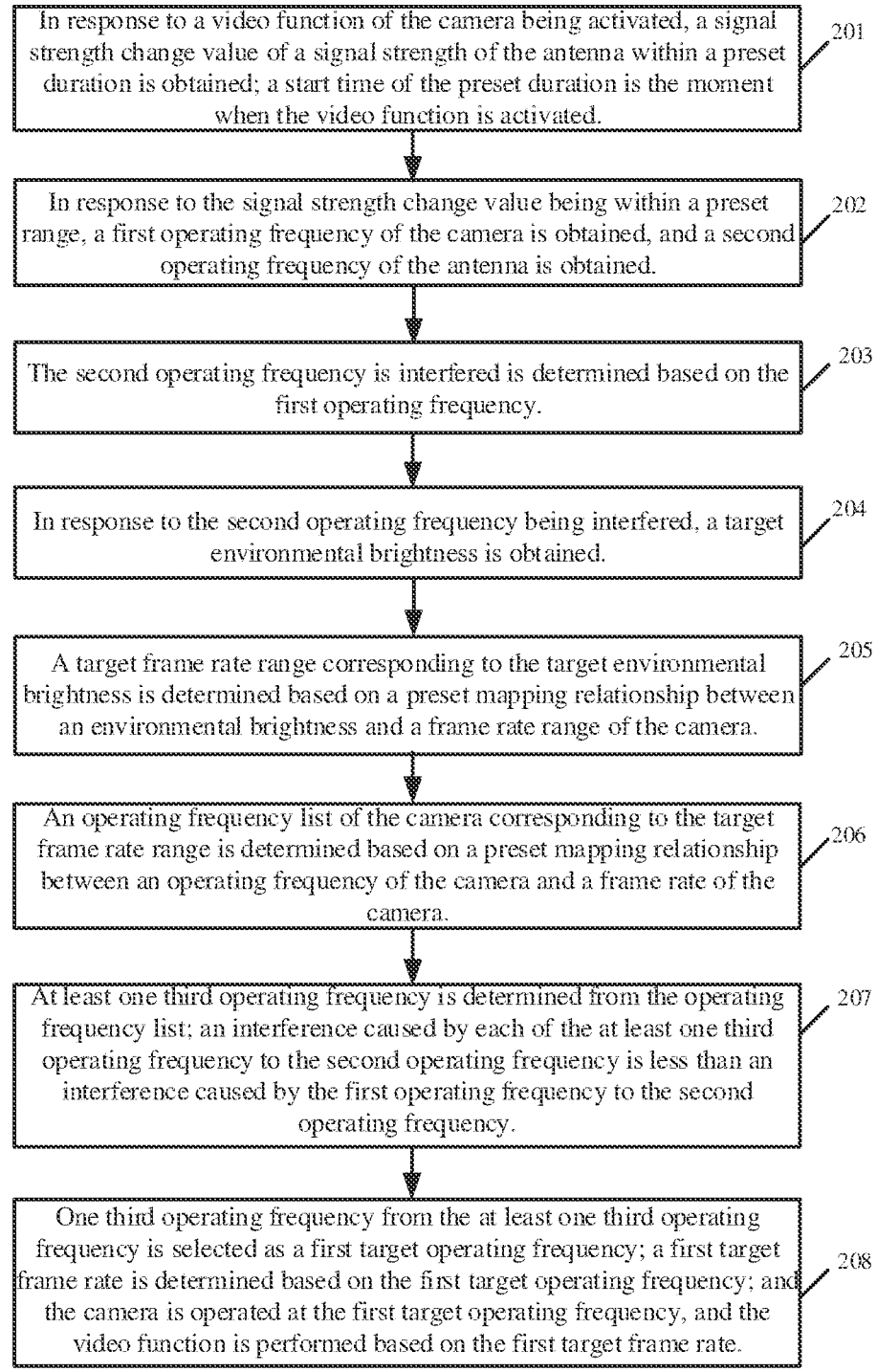
FIG. 2 is a flowchart of an electromagnetic interference control method according to another embodiment of the present disclosure.

Consistent with the above, FIG. 2 is a flowchart of an electromagnetic interference control method according to another embodiment of the present disclosure and applied to the electronic device as shown in FIG. 1A. The electronic device includes an antenna and a camera. The electromagnetic interference control method may include following operations at blocks 201-208.

At block 201: In response to a video function of the camera being activated, a signal strength change value of a signal strength of the antenna within a preset duration is obtained; a start time of the preset duration is the moment when the video function is activated.

At block 202: In response to the signal strength change value being within a preset range, a first operating frequency of the camera is obtained, and a second operating frequency of the antenna is obtained.

At block 203: The second operating frequency is interfered is determined based on the first operating frequency.

At block 204: In response to the second operating frequency being interfered, a target environmental brightness is obtained.

At block 205: A target frame rate range corresponding to the target environmental brightness is determined based on a preset mapping relationship between an environmental brightness and a frame rate range of the camera.

At block 206: An operating frequency list of the camera corresponding to the target frame rate range is determined based on a preset mapping relationship between an operating frequency of the camera and a frame rate of the camera.

At block 207: At least one third operating frequency is determined from the operating frequency list; an interference caused by each of the at least one third operating frequency to the second operating frequency is less than an interference caused by the first operating frequency to the second operating frequency.

At block 208: One third operating frequency from the at least one third operating frequency is selected as a first target operating frequency; a first target frame rate is determined based on the first target operating frequency; and the camera is operated at the first target operating frequency, and the video function is performed based on the first target frame rate.

For the detailed description of the above operations 201 to 208, reference may be made to the corresponding description of the electromagnetic interference control method described in FIG. 1B, which will not be repeated here.

It can be seen that in the electromagnetic interference control method described in the embodiments of the present disclosure, when the video function of the camera of the electronic device is activated, the first operating frequency of the camera is obtained, and the second operating frequency of the antenna is obtained; the signal strength change value of the signal strength of the antenna within the preset duration is obtained; the start time of the preset duration is the moment when the video function is activated; when the signal strength change value is within the preset range, whether the second operating frequency is interfered is determined based on the first operating frequency; in response to the second operating frequency being interfered, a target environmental brightness is obtained; a target frame rate range corresponding to the target environmental brightness is determined based on a preset mapping relationship between an environmental brightness and a frame rate range of the camera; an operating frequency list of the camera corresponding to the target frame rate range is determined based on a preset mapping relationship between an operating frequency of the camera and a frame rate of the camera; at least one third operating frequency is determined from the operating frequency list; an interference caused by each of the at least one third operating frequency to the second operating frequency is less than an interference caused by the first operating frequency to the second operating frequency; one third operating frequency from the at least one third operating frequency is selected as a first target operating frequency; a first target frame rate is determined based on the first target operating frequency; and the camera is operated at the first target operating frequency, and the video function is performed based on the first target frame rate. In this way, when video shooting or video chatting, the interference of the camera frame rate on the radio frequency signal of the antenna may be reduced.

Figure 3:
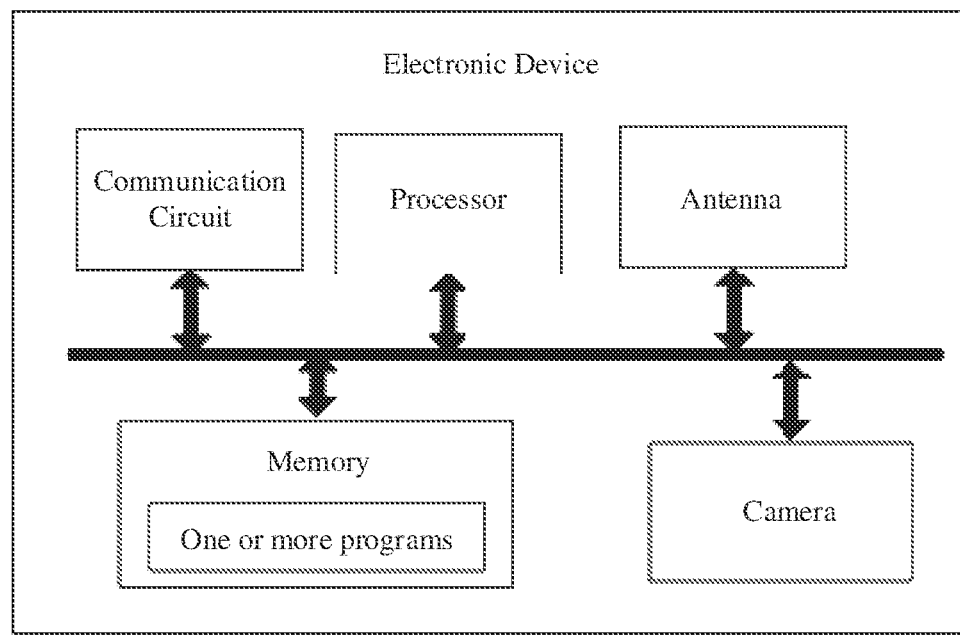
FIG. 3 is a structural schematic view of an electronic device according to another embodiment of the present disclosure.

Referring to FIG. 3, FIG. 3 is a structural schematic view of an electronic device according to another embodiment of the present disclosure. The electronic device includes a processor, a memory, a communication interface, an antenna and a camera, and one or more programs. The one or more programs are stored in the memory and are configured to be executed by the processor. The one or more programs include instructions for executing the following operations.

In response to a video function of the camera being activated, a first operating frequency of the camera is obtained, and a second operating frequency of the antenna is obtained.

Whether the second operating frequency is interfered is determined based on the first operating frequency.

In response to the second operating frequency being interfered, a target frame rate range is obtained.

An operating frequency of the camera corresponding to each frame rate in the target frame rate range is determined based on a preset mapping relationship between the operating frequency of the camera and the frame rate of the camera; an operating frequency list comprising the operating frequency of the camera corresponding to all frame rates is formed.

At least one third operating frequency is determined from the operating frequency list; an interference caused by each of the at least one third operating frequency to the second operating frequency is less than an interference caused by the first operating frequency to the second operating frequency.

One third operating frequency from the at least one third operating frequency is selected as a first target operating frequency; a first target frame rate is determined based on the first target operating frequency; and the camera is operated at the first target operating frequency, and the video function is performed based on the first target frame rate.

In some embodiments, in the aspect of the determining whether the second operating frequency is interfered based on the first operating frequency, the above program includes instructions for executing the following operations.

A target interference frequency list corresponding to the second operating frequency is determined based on a preset correspondence between an operating frequency of the antenna and an interference frequency list of the camera; the target interference frequency list includes at least one operating frequency.

In response to the first operating frequency being in the target interference frequency list, the second operating frequency is determined to be interfered by the first operating frequency.

In some embodiments, in the aspect of the obtaining the target frame rate range, the above program includes instructions for executing the following operations.

A target environmental brightness is obtained.

A target frame rate range corresponding to the target environmental brightness is determined based on a preset mapping relationship between an environmental brightness and a frame rate range of the camera.

In some embodiments, in the aspect of the obtaining the target frame rate range, the above program includes instructions for executing the following operations.

Multiple average gray values are obtained based on an average gray value of each frame of the multi-frame video image.

In some embodiments, in the aspect of the selecting the one third operating frequency from the at least one third operating frequency as the first target operating frequency, the foregoing program includes instructions for executing the following operations.

Multiple reference interference frequency lists are obtained by determining a reference interference frequency list corresponding to each operating frequency in the at least one third operating frequency based on a preset correspondence between the operating frequency of the antenna and the interference frequency list of the camera.

A third operating frequency corresponding to a reference interference frequency list that does not include the second operating frequency is determined in the multiple reference interference frequency lists as the first target operating frequency.

In some embodiments, the above program also includes instructions for performing the following operations.

A multi-frame video image is obtained through the camera.

Multiple average gray values are obtained based on an average gray value of each frame of the multi-frame video image.

A target average gray value corresponding to the multiple average gray values is determined.

The target environmental brightness corresponding to the target average gray value is determined based on a preset mapping relationship between the average gray value and the environmental brightness.

In some embodiments, the above program further includes instructions for executing the following operations.

In response to the second operating frequency changing, whether the first target operating frequency interferes with the changed second operating frequency is detected.

In response to the first target operating frequency interfering with the changed second operating frequency, another third operating frequency is selected from the at least one third operating frequency as a second target operating frequency, wherein an interference caused by the second target operating frequency to the changed second operating frequency is less than an interference caused by the first target operating frequency to the changed second operating frequency; a second target frame rate of the camera is determined based on the second target operating frequency; the camera is operated at the second target operating frequency, and the video function is realized based on the second target frame rate.

In response to the first target operating frequency not interfering with the changed second operating frequency, the operation of operating the camera at the first target operating frequency is performed and the video function is realized based on the first target frame rate.

In some embodiments, before the obtaining the first operating frequency of the camera, the above program includes instructions for executing the following operations.

A signal strength change value of the signal strength of the antenna within a preset duration is obtained, and a start time of the preset duration is the time in response to the video function being activated.

In response to the signal strength change value being within a preset range, the operation of obtaining the first operating frequency of the camera is performed.

The foregoing mainly introduces the solutions of the embodiments of the present disclosure from the perspective of the execution process on the method side. It can be understood that, in order to implement the above-mentioned functions, an electronic device includes hardware structures and/or software modules corresponding to each function. A person skilled in the art should easily realize that in combination with the units and algorithm steps of the examples described in the embodiments provided herein. The present disclosure can be implemented in the form of hardware or a combination of hardware and computer software. Whether a function is executed by hardware or computer software-driven hardware depends on the specific application and design constraints of the technical solution. A person skilled in the art can use different methods for each specific application to implement the described functions, but such implementation should not be considered beyond the scope of the present disclosure.

The embodiments of the present disclosure may divide the electronic device into functional units according to the foregoing method examples. For example, each functional unit may be divided corresponding to each function, or two or more functions may be integrated into one processing unit. The above-mentioned integrated unit can be implemented in the form of hardware or software functional unit. It should be noted that the division of units in the embodiments of the present disclosure is illustrative and is only a logical function division, and there may be other division methods in actual implementation.

Figure 4A:
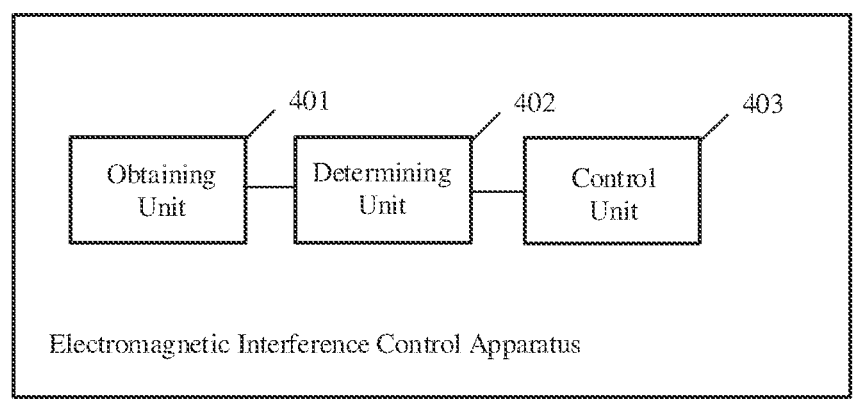
FIG. 4A is a structural schematic view of an electromagnetic interference control apparatus according to an embodiment of the present disclosure.

Referring to FIG. 4A, FIG. 4A is a structural schematic view of an electromagnetic interference control apparatus according to an embodiment of the present disclosure and applied to the electronic device shown in FIG. 1A. The electronic device includes an antenna and a camera. The electromagnetic interference control apparatus includes an obtaining unit 401, a determining unit 402, and a control unit 403.

The obtaining unit 401 is configured to obtain a first operating frequency of the camera and a second operating frequency of the antenna in response to the video function of the camera being activated.

The determining unit 402 is configured to determine the second operating frequency is interfered based on the first operating frequency.

The obtaining unit 401 is further configured to obtain a target frame rate range in response to the second operating frequency being interfered.

The determining unit 402 is further configured to determine an operating frequency of the camera corresponding to each frame rate in the target frame rate range based on a preset mapping relationship between the operating frequency of the camera and the frame rate of the camera; form an operating frequency list comprising the operating frequency of the camera corresponding to all frame rates; and determine at least one third operating frequency from the operating frequency list, wherein an interference caused by each of the at least one third operating frequency to the second operating frequency is less than an interference caused by the first operating frequency to the second operating frequency.

The control unit 403 is configured to select one third operating frequency from the at least one third operating frequency as a first target operating frequency; determine a first target frame rate based on the first target operating frequency; operate the camera at the first target operating frequency; and perform the video function based on the first target frame rate.

In some embodiments, in the aspect of the determining whether the second operating frequency is interfered based on the first operating frequency, the determining unit 402 is specifically configured to perform the following operations.

A target interference frequency list corresponding to the second operating frequency is determined based on a preset correspondence between an operating frequency of the antenna and an interference frequency list of the camera; the target interference frequency list includes at least one operating frequency.

In response to the first operating frequency being in the target interference frequency list, the second operating frequency is determined to be interfered by the first operating frequency.

In some embodiments, in the aspect of the obtaining the target frame rate range, the obtaining unit 401 is specifically configured to perform the following operations.

A target environmental brightness is obtained.

A target frame rate range corresponding to the target environmental brightness is determined based on a preset mapping relationship between an environmental brightness and a frame rate range of the camera.

In some embodiments, in the aspect of the obtaining the target environmental brightness, the obtaining unit 401 is specifically configured to perform the following operations.

A multi-frame video image is obtained through the camera.

Multiple average gray values are obtained based on an average gray value of each frame of the multi-frame video image.

A target average gray value corresponding to the multiple average gray values is determined.

The target environmental brightness corresponding to the target average gray value is determined based on a preset mapping relationship between the average gray value and the environmental brightness.

In some embodiments, in the aspect of determining the target average gray value corresponding to the multiple average gray values, the obtaining unit 401 is specifically configured to perform the following operations.

An average value of the multiple average gray values is determined to obtain the target average gray value.

In the aspect of the selecting the one third operating frequency from the at least one third operating frequency as the first target operating frequency, the control unit 403 is specifically configured to perform the following operations.

Multiple reference interference frequency lists are obtained by determining a reference interference frequency list corresponding to each operating frequency in the at least one third operating frequency based on a preset correspondence between the operating frequency of the antenna and the interference frequency list of the camera.

A third operating frequency corresponding to a reference interference frequency list that does not include the second operating frequency is determined in the multiple reference interference frequency lists as the first target operating frequency.

Figure 4B:
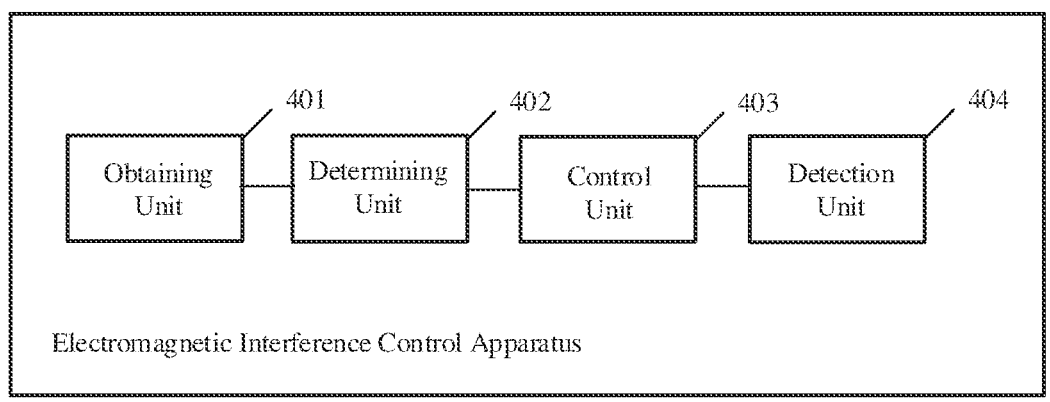
FIG. 4B is a structural schematic view of an electromagnetic interference control apparatus according to another embodiment of the present disclosure.

In some embodiments, as shown in FIG. 4B, FIG. 4B is a structural schematic view of an electromagnetic interference control apparatus according to another embodiment of the present disclosure. Compared with FIG. 4A, the electromagnetic interference control apparatus may further include a detection unit 404.

The detecting unit 404 is configured to detect whether the first target operating frequency interferes with the changed second operating frequency in response to the second operating frequency changing.

The control unit 403 is further specifically configured to, in response to the first target operating frequency interfering with the changed second operating frequency, select another third operating frequency from the at least one third operating frequency as a second target operating frequency, wherein an interference caused by the second target operating frequency to the changed second operating frequency is less than an interference caused by the first target operating frequency to the changed second operating frequency; determine a second target frame rate of the camera based on the second target operating frequency; operate the camera at the second target operating frequency; and realize the video function based on the second target frame rate.

The control unit 403 is further specifically configured to, in response to the first target operating frequency not interfering with the changed second operating frequency, perform the operation of operating the camera at the first target operating frequency; and realize the video function based on the first target frame rate.

In some embodiments, the obtaining unit 401 is further specifically configured to obtain a signal strength change value of the signal strength of the antenna within a preset duration, wherein a start time of the preset duration is the time in response to the video function being activated.

The obtaining unit 401 is further specifically configured to perform the operation of obtaining the first operating frequency of the camera in response to the signal strength change value being within a preset range.

It can be seen that in the electromagnetic interference control apparatus described in the embodiments of the present disclosure, when the video function of the camera is activated, the first operating frequency of the camera is obtained, and the second operating frequency of the antenna is obtained; whether the second operating frequency is interfered is determined based on the first operating frequency; in response to the second operating frequency being interfered, a target frame rate range is obtained; the operating frequency of the camera corresponding to each frame rate in the target frame rate range is determined based on the preset mapping relationship between the operating frequency of the camera and the frame rate of the camera; an operating frequency list comprising the operating frequency of the camera corresponding to all frame rates is formed; at least one third operating frequency is determined from the operating frequency list; an interference caused by each of the at least one third operating frequency to the second operating frequency is less than an interference caused by the first operating frequency to the second operating frequency; one third operating frequency from the at least one third operating frequency is selected as a first target operating frequency; a target frame rate is determined based on the first target operating frequency; and the camera is operated at the first target operating frequency, and the video function is performed based on the first target frame rate. In this way, when video shooting or video chatting, the interference of the camera frame rate on the radio frequency signal of the antenna may be reduced.

It should be noted that the electronic device described in the embodiments of the present disclosure are presented in the form of functional units. The term "unit" mentioned here should be understood as the broadest possible meaning. Objects to implement the functions described by each "unit" may be, for example, an application specific integrated circuit (ASIC), a single circuit, a processor (shared, dedicated or chipset) and a memory configured to execute one or more software or firmware program, a combinational logic circuit, and/or other suitable components that provide the above functions.

The obtaining unit 401, the determining unit 402, the control unit 403, and the detection unit 404 may be control circuits or processors.

An embodiment of the present disclosure also provides a computer storage medium. The computer storage medium stores a computer program for electronic data exchange. The computer program enables a computer to execute part or all of the operations of any electromagnetic interference control method described in the above method embodiments.

An embodiment of the present disclosure also provide a computer program product including a non-transitory computer-readable storage medium storing a computer program. The computer program is operable to cause a computer to execute part or all of the operations of any electromagnetic interference control method described in the above method embodiments.

It should be noted that, for ease of description, the foregoing method embodiments are all expressed as a series of action combinations, but a person skilled in the art should know that the present disclosure is not limited by the described sequence of actions. According to the present disclosure, some operations can be performed in other order or simultaneously. A person skilled in the art should also know that the embodiments described in the specification are all preferred embodiments, and the involved actions and modules are not necessarily required by the present disclosure.

In the above-mentioned embodiments, the description of each embodiment has its own focus. For parts that are not described in detail in an embodiment, reference may be made to related descriptions of other embodiments.

In the several embodiments provided in the present disclosure, it should be understood that the disclosed apparatus may be implemented in other ways. For example, the apparatus embodiments described above are merely illustrative. For example, the division of the units is only a logical function division, and there may be other divisions in actual implementation. For example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, and may be in electrical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit. The above-mentioned integrated unit can be implemented in the form of hardware or software program module.

When the integrated unit is implemented in the form of a software program module and sold or used as an independent product, it can be stored in a computer readable memory. Based on this understanding, the technical solution of the present disclosure essentially or the part that contributes to the existing technology, or all or part of the technical solution can be embodied in the form of a software product, and the computer software product is stored in a memory, A number of instructions are included to enable a computer device (which may be a personal computer, a server, or a network device, etc.) to execute all or part of the steps of the method described in each embodiment of the present disclosure. The aforementioned memory includes: U disk, read-only memory (ROM), random access memory (RAM), mobile hard disk, magnetic disk, or optical disk and other media that can store program codes.

A person skilled in the art can understand that all or part of the operations in the various methods of the above-mentioned embodiments can be completed by a program instructing relevant hardware. The program can be stored in a computer-readable memory, and the memory can include: flash disk, ROM, RAM, magnetic disk or CD, etc.

The embodiments of the present disclosure are described in detail above, and specific examples are used in this article to illustrate the principles and implementation of the present disclosure. The descriptions of the above embodiments are only to help understand the methods and core ideas of the present disclosure. A person skilled in the art, based on the idea of the present disclosure, can make changes in the specific implementation and the scope of application. In summary, the content of this specification should not be construed as limiting the present disclosure.

What is claimed is:

1. An electromagnetic interference control method for an electronic device; wherein the electronic device comprises an antenna and a camera; the electromagnetic interference control method comprises:
   obtaining a first operating frequency of the camera and a second operating frequency of the antenna in response to a video function of the camera being activated;
   determining the second operating frequency is interfered based on the first operating frequency;
   in response to the second operating frequency being interfered, obtaining a target frame rate range;
   determining an operating frequency of the camera corresponding to each frame rate in the target frame rate range based on a preset mapping relationship between an operating frequency of the camera and a frame rate of the camera; and obtaining an operating frequency list comprising the operating frequency of the camera corresponding to all frame rates in the target frame rate range;
   determining at least one third operating frequency from the operating frequency list, wherein an interference caused by each of the at least one third operating frequency to the second operating frequency is less than an interference caused by the first operating frequency to the second operating frequency; and
   selecting one third operating frequency from the at least one third operating frequency as a first target operating frequency; determining a first target frame rate based on the first target operating frequency; operating the camera at the first target operating frequency; and performing the video function based on the first target frame rate.

2. The electromagnetic interference control method according to claim 1, wherein the determining the second operating frequency is interfered based on the first operating frequency comprises:
   determining a target interference frequency list corresponding to the second operating frequency based on a preset correspondence between an operating frequency of the antenna and an interference frequency list of the camera and
   in response to the first operating frequency being in the target interference frequency list, determining the second operating frequency being interfered by the first operating frequency.

3. The electromagnetic interference control method according to claim 2, wherein the obtaining the target frame rate range comprises:
   obtaining a target environmental brightness; and
   determining the target frame rate range corresponding to the target environmental brightness based on a preset mapping relationship between an environmental brightness and a frame rate range of the camera.

4. The electromagnetic interference control method according to claim 3, wherein the obtaining the target environmental brightness comprises:
   obtaining a multi-frame video image through the camera;
   obtaining a plurality of average gray values based on an average gray value of each frame of the multi-frame video image;
   determining a target average gray value corresponding to the plurality of average gray values; and
   determining the target environmental brightness corresponding to the target average gray value based on a preset mapping relationship between the average gray value and the environmental brightness.

5. The electromagnetic interference control method according to claim 4, wherein the determining the target average gray value corresponding to the plurality of average gray values comprises:
   obtaining the target average gray value based on an average value of the plurality of average gray values.

6. The electromagnetic interference control method according to claim 3, wherein the obtaining the target environmental brightness comprises:
   detecting the target environmental brightness through an environmental light sensor arranged in the electronic device.

7. The electromagnetic interference control method according to claim 1, wherein the selecting the one third operating frequency from the at least one third operating frequency as the first target operating frequency comprises:
   obtaining a plurality of reference interference frequency lists by determining a reference interference frequency list corresponding to each operating frequency in the at least one third operating frequency based on a preset correspondence between the operating frequency of the antenna and an interference frequency list of the camera; and
   determining the one third operating frequency corresponding to a reference interference frequency list that does not comprise the second operating frequency in the plurality of reference interference frequency lists as the first target operating frequency.

8. The electromagnetic interference control method according to claim 1, further comprising:
   in response to the second operating frequency changing, detecting whether the first target operating frequency interferes with the changed second operating frequency;
   in response to the first target operating frequency interfering with the changed second operating frequency, selecting another third operating frequency from the at least one third operating frequency as a second target operating frequency, wherein an interference caused by the second target operating frequency to the changed second operating frequency is less than an interference caused by the first target operating frequency to the changed second operating frequency; determining a second target frame rate of the camera based on the second target operating frequency; operating the camera at the second target operating frequency; and performing the video function based on the second target frame rate; and
   in response to the first target operating frequency not interfering with the changed second operating frequency, performing the operating the camera at the first target operating frequency, and performing the video function based on the first target frame rate.

9. The electromagnetic interference control method according to claim 1, further comprising:
   obtaining a signal strength change value of a signal strength of the antenna within a preset duration, wherein a start time of the preset duration is the time in response to the video function being activated; and
   in response to the signal strength change value being within a preset range, performing the obtaining the first operating frequency of the camera.

10. An electronic device, comprising: an antenna, a camera, a processor, a memory, a communication interface, and one or more programs; wherein the one or more programs are stored in the memory and are configured to be performed by the processor; the one or more programs comprises instructions configured to perform:
obtaining a first operating frequency of the camera and a second operating frequency of the antenna in response to a video function of the camera being activated;
determining the second operating frequency is interfered based on the first operating frequency;
in response to the second operating frequency being interfered, obtaining a target frame rate range;
determining an operating frequency of the camera corresponding to each frame rate in the target frame rate range based on a preset mapping relationship between an operating frequency of the camera and a frame rate of the camera; and obtaining an operating frequency list comprising the operating frequency of the camera corresponding to all frame rates in the target frame rate range;
determining at least one third operating frequency from the operating frequency list, wherein an interference caused by each of the at least one third operating frequency to the second operating frequency is less than an interference caused by the first operating frequency to the second operating frequency; and
selecting one third operating frequency from the at least one third operating frequency as a first target operating frequency; determining a first target frame rate based on the first target operating frequency; operating the camera at the first target operating frequency; and performing the video function based on the first target frame rate.

11. The electronic device according to claim 10, wherein the determining the second operating frequency is interfered based on the first operating frequency comprises:
determining a target interference frequency list corresponding to the second operating frequency based on a preset correspondence between an operating frequency of the antenna and an interference frequency list of the camera and
in response to the first operating frequency being in the target interference frequency list, determining the second operating frequency being interfered by the first operating frequency.

12. The electronic device according to claim 10, wherein the obtaining the target frame rate range comprises:
obtaining a target environmental brightness; and
determining the target frame rate range corresponding to the target environmental brightness based on a preset mapping relationship between an environmental brightness and a frame rate range of the camera.

13. The electronic device according to claim 12, wherein the obtaining the target environmental brightness comprises:
obtaining a multi-frame video image through the camera;
obtaining a plurality of average gray values based on an average gray value of each frame of the multi-frame video image;
determining a target average gray value corresponding to the plurality of average gray values; and
determining the target environmental brightness corresponding to the target average gray value based on a preset mapping relationship between the average gray value and the environmental brightness.

14. The electronic device according to claim 13, wherein the determining the target average gray value corresponding to the plurality of average gray values comprises:
obtaining the target average gray value based on an average value of the plurality of average gray values.

15. The electronic device according to claim 12, wherein the obtaining the target environmental brightness comprises:
detecting the target environmental brightness through an environmental light sensor arranged in the electronic device.

16. The electronic device according to claim 10, wherein the selecting the one third operating frequency from the at least one third operating frequency as the first target operating frequency comprises:
obtaining a plurality of reference interference frequency lists by determining a reference interference frequency list corresponding to each operating frequency in the at least one third operating frequency based on a preset correspondence between the operating frequency of the antenna and an interference frequency list of the camera; and
determining the one third operating frequency corresponding to a reference interference frequency list that does not comprise the second operating frequency in the plurality of reference interference frequency lists as the first target operating frequency.

17. The electronic device according to claim 10, wherein the instructions are further configured to perform:
in response to the second operating frequency changing, detecting whether the first target operating frequency interferes with the changed second operating frequency;
in response to the first target operating frequency interfering with the changed second operating frequency, selecting another third operating frequency from the at least one third operating frequency as a second target operating frequency, wherein an interference caused by the second target operating frequency to the changed second operating frequency is less than an interference caused by the first target operating frequency to the changed second operating frequency; determining a second target frame rate of the camera based on the second target operating frequency; operating the camera at the second target operating frequency; and performing the video function based on the second target frame rate; and
in response to the first target operating frequency not interfering with the changed second operating frequency, performing the operating the camera at the first target operating frequency, and performing the video function based on the first target frame rate.

18. The electronic device according to claim 10, wherein the instructions are further configured to perform:
obtaining a signal strength change value of a signal strength of the antenna within a preset duration, wherein a start time of the preset duration is the time in response to the video function being activated; and
in response to the signal strength change value being within a preset range, performing the obtaining the first operating frequency of the camera.

19. A non-transitory computer-readable storage medium, storing a computer program for exchange of electronic data; wherein the computer program causes a computer to perform:
obtaining a first operating frequency of a camera and a second operating frequency of an antenna in response to a video function of the camera being activated;
determining the second operating frequency is interfered based on the first operating frequency;
in response to the second operating frequency being interfered, obtaining a target frame rate range;

determining an operating frequency of the camera corresponding to each frame rate in the target frame rate range based on a preset mapping relationship between an operating frequency of the camera and a frame rate of the camera; and obtaining an operating frequency list comprising the operating frequency of the camera corresponding to all frame rates in the target frame rate range;

determining at least one third operating frequency from the operating frequency list, wherein an interference caused by each of the at least one third operating frequency to the second operating frequency is less than an interference caused by the first operating frequency to the second operating frequency; and selecting one third operating frequency from the at least one third operating frequency as a first target operating frequency; determining a first target frame rate based on the first target operating frequency; operating the camera at the first target operating frequency; and performing the video function based on the first target frame rate.

20. The non-transitory computer-readable storage medium according to claim 19, wherein the determining the second operating frequency is interfered based on the first operating frequency comprises:

determining a target interference frequency list corresponding to the second operating frequency based on a preset correspondence between an operating frequency of the antenna and an interference frequency list of the camera and in response to the first operating frequency being in the target interference frequency list, determining the second operating frequency being interfered by the first operating frequency.

\* \* \* \* \*